United States Patent
You et al.

(10) Patent No.: US 10,308,176 B2
(45) Date of Patent: Jun. 4, 2019

(54) VEHICLE AND CONTROL METHOD THEREOF

(71) Applicant: HYUNDAI MOTOR COMPANY, Seoul (KR)

(72) Inventors: Jung Keun You, Suwon-si (KR); Jinseok Hong, Suwon-si (KR); MunHwan Cho, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/380,866

(22) Filed: Dec. 15, 2016

(65) Prior Publication Data

US 2018/0118107 A1    May 3, 2018

(30) Foreign Application Priority Data

Nov. 1, 2016  (KR) .......................... 10-2016-0144273

(51) Int. Cl.
   *B60Q 5/00*    (2006.01)
   *G08G 1/005*   (2006.01)
   *G06K 9/00*    (2006.01)

(52) U.S. Cl.
   CPC ............. *B60Q 5/008* (2013.01); *G08G 1/005* (2013.01); *G06K 9/00369* (2013.01); *G06K 9/00805* (2013.01)

(58) Field of Classification Search
   CPC ..... B60Q 5/008; G06K 9/00369; G08G 1/005
   See application file for complete search history.

(56) References Cited

U.S. PATENT DOCUMENTS

| 2004/0183906 A1* | 9/2004 | Nagaoka ............... B60R 1/00 348/148 |
| 2009/0154736 A1* | 6/2009 | Lee ..................... H04R 1/323 381/300 |
| 2014/0085470 A1* | 3/2014 | Sako .................... G03B 21/006 348/148 |

FOREIGN PATENT DOCUMENTS

| JP | 2014-61786 A    | 4/2014 |
| JP | 5516454 B2      | 6/2014 |
| JP | 2016-34780 A    | 3/2016 |
| KR | 10-1017735 B1   | 2/2011 |
| KR | 10-2011-0109270 A | 10/2011 |
| KR | 10-2014-0071121 A | 6/2014 |
| KR | 10-2015-0097010 A | 8/2015 |

* cited by examiner

Primary Examiner — James J Yang
(74) Attorney, Agent, or Firm — Knobbe Martens Olson & Bear LLP

(57) ABSTRACT

Disclosed are a vehicle and a control method thereof, and more particularly, a technique for imaging a pedestrian near a vehicle, acquiring location information of the pedestrian in real time, and outputting warning sounds in a direction in which the pedestrian is located on the basis of the acquired location information of the pedestrian. The vehicle includes an imaging device configured to capture an image of a pedestrian and acquire location information of the pedestrian, a controller configured to generate a control signal for outputting warning sounds in a direction in which the pedestrian is located based on the acquired location information of the pedestrian when the pedestrian is located within a predetermined distance from the vehicle, and a speaker array configured to output the warning sounds in the direction in which the pedestrian is located based on the generated control signal.

16 Claims, 15 Drawing Sheets

VEHICLE AND CONTROL METHOD THEREOF

CROSS-REFERENCE TO RELATED APPLICATION

This application claims the benefit of Korean Patent Application No. 10-2016-0144273, filed on Nov. 1, 2016 in the Korean Intellectual Property Office, the disclosure of which is incorporated herein by reference.

BACKGROUND

1. Field

Embodiments of the present disclosure relate a vehicle and a control method thereof, and more particularly, a technique for capturing an image of pedestrian near a vehicle, acquiring location information of the pedestrian in real time, and outputting warning sounds in a direction in which the pedestrian is located based on the location information.

2. Description of the Related Art

A vehicle is a device for carrying or transporting people or objects to their destinations while running on a road or track. A vehicle can move to several locations by using one or more wheels installed on a body of the vehicle. Examples of the vehicle may include a three-wheeled or four-wheeled vehicle, a two-wheeled vehicle such as a motorcycle, a construction machine, a bicycle, and a train which runs on rails of a track.

In modern society, an automobile is the most common means of transportation, and the number of people using automobiles is increasing. Development of automotive technology facilitates long-distance movement and makes daily life easier. However, road traffic conditions may deteriorate in a place with a high population density such as South Korea, thus causing frequent occurrence of serious traffic congestion.

As a system for preventing traffic accidents between vehicles and pedestrians during road driving, there has been used a technique for using a sensor installed in a vehicle to output warning sounds to a driver of the vehicle when a pedestrian is within a certain distance from the vehicle so that the driver may recognize this situation. However, such a technique has a problem in that warning sounds should be driver triggered and thus cannot be promptly and properly output to the pedestrian.

Also, along with rapid development of electric vehicles, many vehicles with no noise sources are being developed. When an engine is not installed in such a vehicle, there is almost no noise produced by the vehicle. Accordingly, pedestrians have difficulty in recognizing the presence of the vehicle.

The disclosure of this section is to provide background of the invention. Applicant notes that this section may contain information available before this application. However, by providing this section, Applicant does not admit that any information contained in this section constitutes prior art.

SUMMARY

An aspect of the present disclosure facilitates a pedestrian's recognition of a vehicle by capturing an image of a pedestrian near the vehicle, acquiring location information of the pedestrian in real time, and outputting warning sounds only in a direction in which the pedestrian is located, thus preventing an accident in advance and reducing generation of unnecessary noise.

In accordance with one aspect of the present disclosure, a vehicle includes an imaging device configured to capture an image of a pedestrian and acquire location information of the pedestrian, a controller configured to generate a control signal for outputting warning sounds in a direction in which the pedestrian is located based on the acquired location information of the pedestrian when the pedestrian is located within a predetermined distance from the vehicle, and a speaker array configured to output the warning sounds in the direction in which the pedestrian is located based on the generated control signal.

The imaging device may acquire coordinate information of the pedestrian with respect to the vehicle by capturing the image of the pedestrian.

The controller may generate a control signal for outputting the warning sounds to an area within a predetermined distance from the pedestrian based on the acquired location information of the pedestrian.

The controller may calculate a distance between the vehicle and the pedestrian based on the acquired location information of the pedestrian.

The controller may control intensities of the warning sounds output by the speaker array based on the calculated distance between the vehicle and the pedestrian.

The controller may generate a control signal for removing warning sounds output in a direction in which the pedestrian is not located.

The speaker array may be provided at a front of the vehicle and may include at least one speaker that outputs warning sounds.

When there are a plurality of pedestrians, the controller may generate a control signal for outputting warning sounds in directions in which the plurality of pedestrians are located.

When there are a plurality of pedestrians, the controller may generate a control signal for outputting warning sounds to an area where the plurality of pedestrians are located.

The controller may control intensities of the warning sounds output by the speaker array based on location information of the plurality of pedestrians.

The controller may calculate a time-to-collision (TTC) between the vehicle and the pedestrian and may control intensities of the warning sounds output by the speaker array based on the calculated TTC.

In accordance with another aspect of the present disclosure, a vehicle control method includes capturing an image of a pedestrian, acquiring location information of the pedestrian based on the captured image, generating a control signal for outputting warning sounds in a direction in which the pedestrian is located based on the acquired location information of the pedestrian when the pedestrian is located within a predetermined distance from the vehicle, and outputting the warning sounds in the direction in which the pedestrian is located based on the generated control signal.

The acquiring of location information of the pedestrian may include acquiring coordinate information of the pedestrian with respect to the vehicle by capturing the image of the pedestrian.

The generating of a control signal may include generating a control signal for outputting the warning sounds to an area within a predetermined distance from the pedestrian based on the acquired location information of the pedestrian.

The vehicle control method may further include calculating a distance between the vehicle and the pedestrian based on the acquired location information of the pedestrian.

The generating of a control signal may include controlling intensities of the warning sounds output by the speaker array based on the calculated distance between the vehicle and the pedestrian.

The generating of a control signal may include generating a control signal for removing warning sounds output in directions in which the pedestrian is not located.

The generating of a control signal may include, when there are a plurality of pedestrians, generating a control signal for outputting warning sounds in directions in which the plurality of pedestrians are located.

The generating of a control signal may include, when there are a plurality of pedestrians, generating a control signal for outputting warning sounds to an area where the plurality of pedestrians are located.

The generating of a control signal may include controlling intensities of the warning sounds output by the speaker array based on location information of the plurality of pedestrians.

The vehicle control method may further include calculating a time-to-collision (TTC) between the vehicle and the pedestrian.

The generating of a control signal may include controlling intensities of the warning sounds output by the speaker array based on the calculated TTC.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
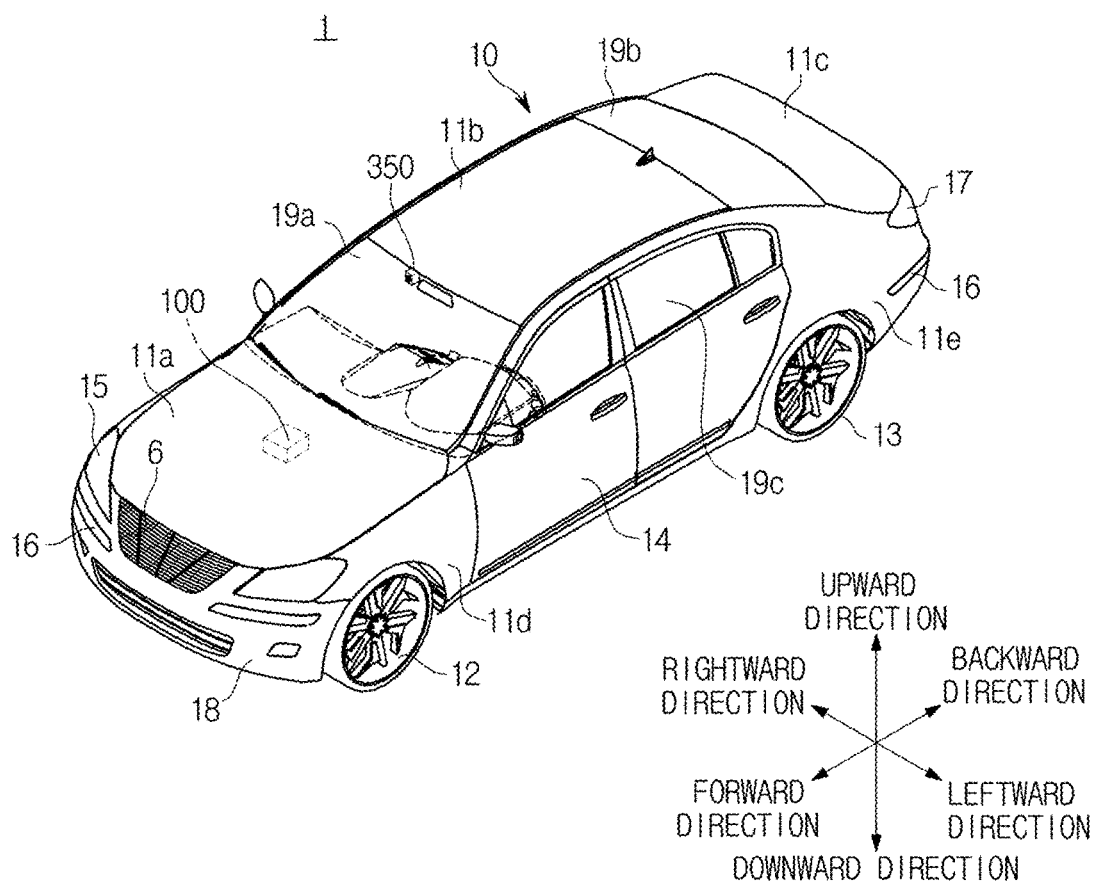
FIG. 1 is a perspective view schematically showing an external appearance of a vehicle according to an embodiment.

Reference will now be made in detail to embodiments of the present disclosure, examples of which are illustrated in the accompanying drawings, wherein like reference numerals refer to like elements throughout.

This disclosure does not describe all elements of embodiments, and a general description in a technical field to which the present invention belongs or a repetitive description in embodiments will be omitted. As used herein, a "unit," "module," "member," or "block" may be implemented as software or hardware. Depending on embodiments, a plurality of "units," "modules," "members," or "blocks" may be implemented as one element, or one "unit," "module," "member," or "block" may include a plurality of elements.

In this disclosure below, when one part is referred to as being "connected" to another part, it should be understood that the former can be "directly connected" to the latter, or "indirectly connected" via a wireless communication network.

Furthermore, when one part is referred to as "comprising" (or "including" or "having") other elements, it should be understood that it can comprise (or include or have) only those elements, or it can comprise (or include or have) other elements as well as those elements unless specifically described otherwise.

Relational terms such as first, second, and the like may be used to distinguish one element from another, and the elements should not be limited by the terms.

The singular forms "a," "an," and "the" are intended to include the plural forms as well unless clearly indicated otherwise by context.

Reference numerals of steps are used for convenience of description and do not describe an order of the steps. Accordingly, the steps may be performed in a different order from that described herein, unless clearly indicated otherwise by context.

Hereinafter, a functional principle and embodiments of the present invention will be described with reference to the accompanying drawings.

An aspect of the present invention discloses a system and method for providing an alarming sound to a pedestrian in front of the vehicle.

In embodiments, an array of speakers 400 is arranged in a front portion of the vehicle 1. Speakers of the speaker array can be controlled individually or in combination to generate a directional alarming sound to a pedestrian in front of the vehicle 1. In embodiments, the speakers 400 are controlled such that the alarming sound has a higher volume or intensity in a selected direction toward the pedestrian.

In embodiments, a computerized controller detects a pedestrian in front of the vehicle and determines a location of the pedestrian (distance and/or direction from the vehicle) using signals from at least one sensor installed in the vehicle. In embodiment, the controller processes images (video frames) captured by a camera installed in the vehicle and determines a distance and a direction of the pedestrian from a point of the vehicle. In embodiments, using the determined direction of the pedestrian, the controller caused the speaker to generate a directional alarming sound toward the detected such that a sound beam of the alarming sound is directed toward the pedestrian.

Figure 10:
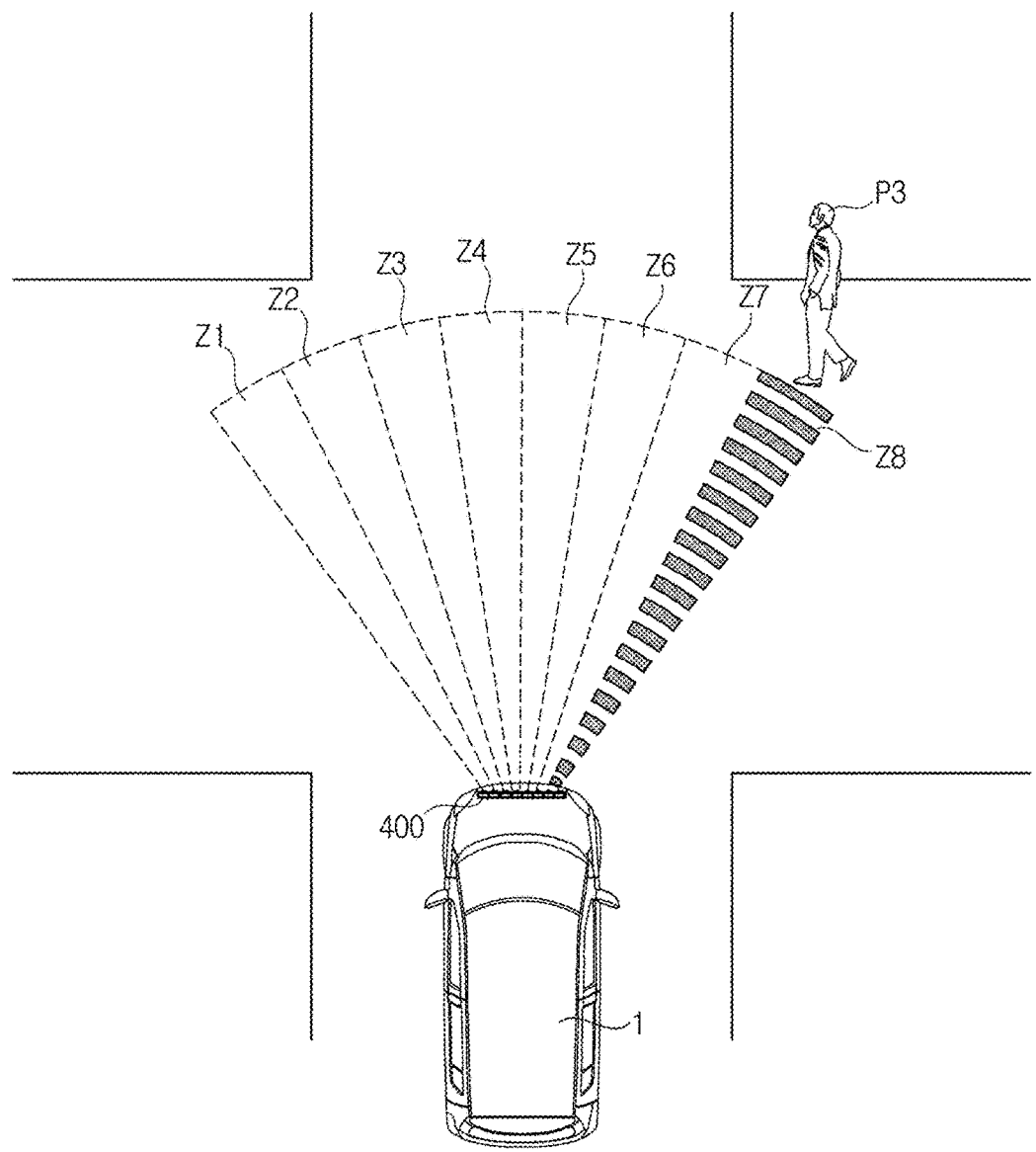
FIG. 10 is a conceptual view showing an example in which a speaker array outputs warning sounds to a pedestrian according to an embodiment.
Figure 11:
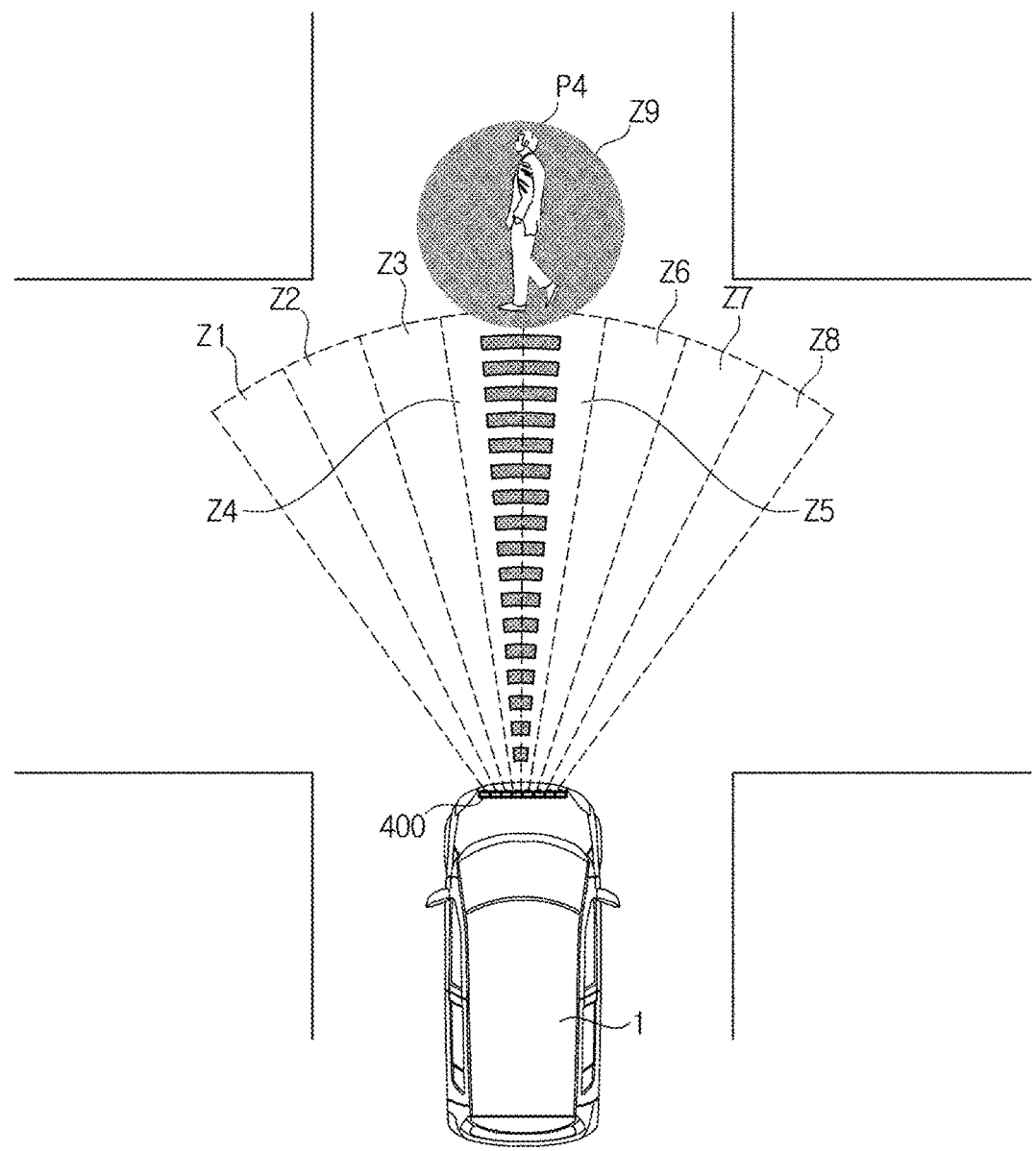
FIG. 11 is a conceptual view showing an example in which a speaker array outputs warning sounds to an area within a predetermined distance from a pedestrian according to an embodiment.

In embodiments, as illustrated in FIG. 10, when the pedestrian is detected in a fan-shape orientation segment Z8, the alarming sound from the speakers 40 has a higher volume or intensity in the segment Z8 when compared to other segments Z1 to Z7 in which no pedestrian is detected. In embodiments, as illustrated in FIG. 11, the alarming sound from the speakers 40 has higher volume or intensity in two or more orientation segments (Z4, Z5) than other segments (Z1-Z3, Z6-Z8), when the location or direction of the pedestrian is within a predetermined angler distance from the two or more orientation segments.

Figure 12:
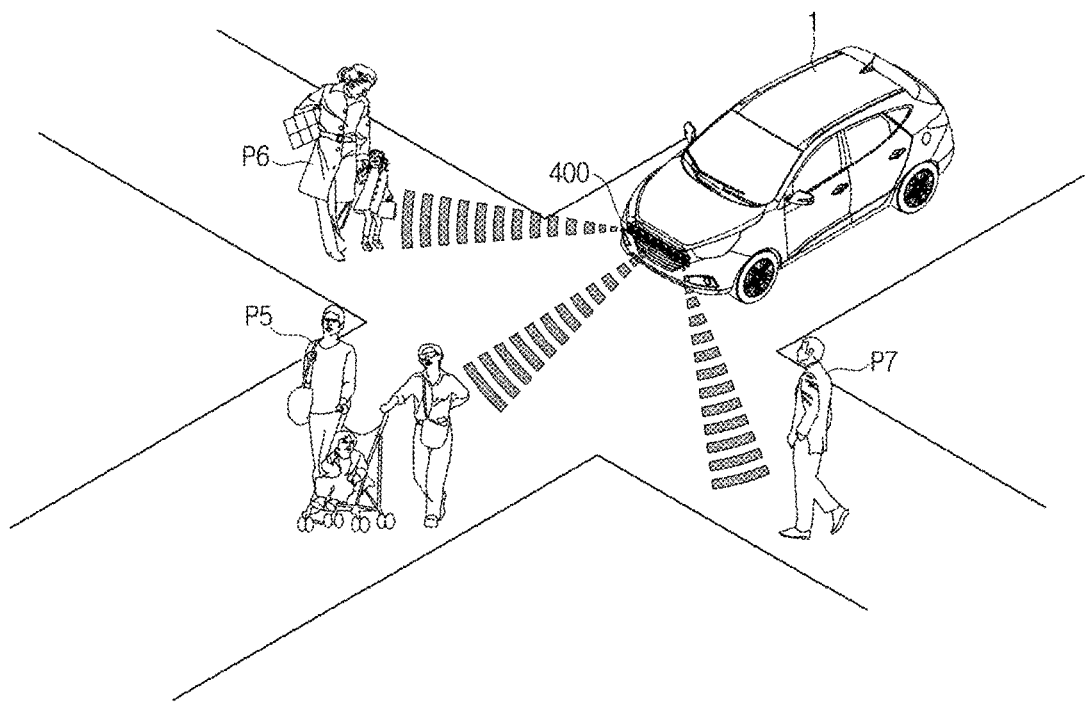
FIG. 12 is a conceptual view showing an example in which a speaker array outputs warning sounds to a plurality of pedestrians according to an embodiment.

In embodiments, as illustrated in FIG. 12 when the controller detects two or more pedestrians (P5, P6, P7), the controller generates a multi-directional alarming sound that has higher volume(s) in multiple directions towards the two or more pedestrians. In embodiments, the controller selects two or more from a set of predetermined orientation segments (Z1-Z8) and sets the volume or intensity of the alarm sound in the selected segments than other segments in which no pedestrians is detected or located.

FIG. 1 is a perspective view schematically showing an external appearance of a vehicle according to an embodiment.

For convenience of description, as shown in FIG. 1, a direction in which a vehicle 1 advances is defined as a forward direction, and a leftward direction and a rightward direction are distinguished with respect to the forward direction. For example, when the forward direction is a 12 o'clock direction, a 3 o'clock direction or the like is defined as the rightward direction, and a 9 o'clock direction or the like is defined as the leftward direction. A direction opposite to the forward direction is referred to as a backward direction. Also, with respect to the vehicle 1, a bottom direction is referred to as a downward direction, and a direction opposite to the downward direction is referred to as an upward direction. In addition, a surface disposed in the forward direction is referred to as a front surface, a surface disposed in the backward direction is referred to as a rear surface, and a surface disposed in the side direction is referred to a side surface. Among side surfaces, a side surface in the leftward direction is defined as a left side surface, and a side surface in the rightward direction is defined as a right side surface.

Referring to FIG. 1, the vehicle 1 may include a main body 10 forming an external appearance of the vehicle 1 and wheels 12 and 13 for moving the vehicle 1.

The main body 10 may include a hood 11a configured to protect various types of devices needed to drive the vehicle 1, such as an engine, a loop panel 11b configured to form an internal space, a trunk lid 11c configured to provide storage space, and a front fender 11d and a quarter panel 11e provided on a side surface of the vehicle 1. Also, a plurality of doors 14 that are hinge-connected to the main body 10 may be provided on side surfaces of the main body 10.

A front window 19a that provides forward visibility of the vehicle 1 may be provided between the hood 11a and the loop panel 11b, and a rear window 19b that provides backward visibility may be provided between the loop panel 11b and the trunk lid 11c. Also, a side window 19c that provides sideward visibility may be provided at an upper portion of each of the doors 14.

Also, a headlamp 15 that provides illumination in a traveling direction of the vehicle 1 may be provided at the front of the vehicle 1.

Also, a turn signal lamp 16 that indicates the traveling direction of the vehicle 1 may be provided at the front or rear of the vehicle 1.

The vehicle 1 may blink the turn signal lamp 16 to display the traveling direction. Also, a tail lamp 17 may be provided at the rear of the vehicle 1. The tail lamp 17 may be provided at the rear of the vehicle 1 to display a gear shift state, brake operation state, and the like of the vehicle 1.

At least one controller 100 may be provided inside the vehicle 1. The controller 100 may be configured to perform electronic control associated with operation of the vehicle 1. The controller 100 may be installed at an arbitrary position inside the vehicle 1 according to a designer's selection. For example, the controller 100 may be installed between an engine compartment and a dashboard or may be provided inside a center fascia. The controller 100 may include at least one processor configured to receive an electric signal, process the received electric signal, and then output the processed signal. The at least one processor may be implemented with at least one semiconductor chip and its associated components. The at least one semiconductor chip and its associated components is installed on a printed circuit board installable in the vehicle 1.

At least one imaging device 350 may be provided inside the vehicle 1. The imaging device 350 may capture surrounding images of the vehicle 1 while the vehicle 1 is running or parked and may acquire location information of a pedestrian near the vehicle 1.

Figure 2:
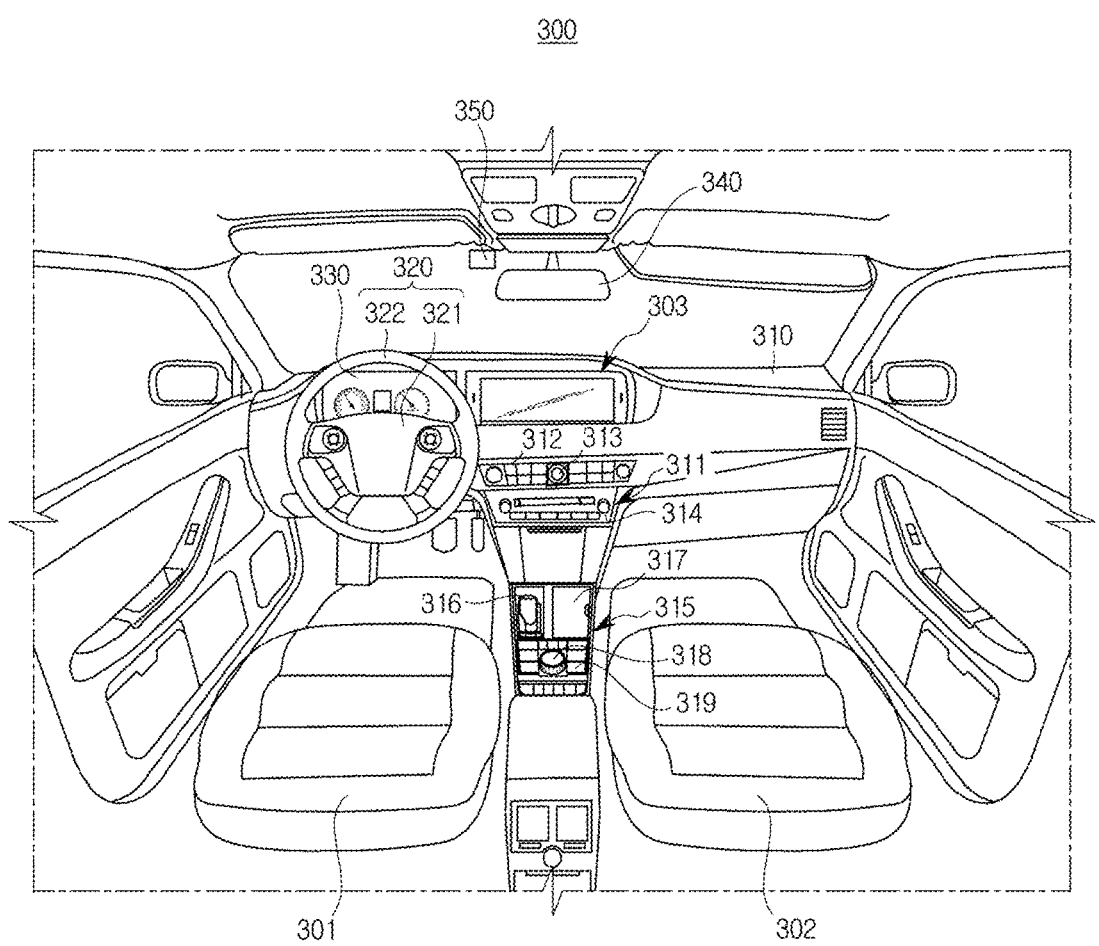
FIG. 2 is a diagram showing an internal structure of a vehicle according to an embodiment.

FIG. 2 is a diagram showing an internal structure of a vehicle according to an embodiment.

Referring to FIG. 2, a driver seat 301, a passenger seat 302, a dashboard 310, a steering wheel 320, and an instrument panel 330 are provided inside a passenger compartment 300.

The dashboard 310 refers to a panel which partitions the passenger compartment and the engine compartment of the vehicle 1 and in which various types of components necessary for driving are installed. The dashboard 310 is provided in front of the driver seat 301 and the passenger seat 302. The dashboard 310 may include an upper panel, a center fascia 311, a gear box 315, etc.

An on-vehicle display device 303 may be installed in the upper panel of the dashboard 310. The on-vehicle display device 303 may provide a variety of information to a driver or a passenger of the vehicle 1. For example, the on-vehicle display device 303 may visually provide a variety of information such as a map, weather, news, various kinds of video or still images, and various kinds of information associated with status or operation of the vehicle 1, for example, information on an air conditioner. Also, the on-vehicle display device 303 may provide a risk-based warning to a driver or a passenger. In detail, when the vehicle 1 changes lanes, the on-vehicle display device 303 may provide different warnings to a driver or the like depending on risk level. Also, the on-vehicle display device 303 may be implemented using a typical navigation device.

The on-vehicle display device 303 may be built in a housing that is integrally formed with the dashboard 310 so that only a display panel is exposed to the outside. Also, the on-vehicle display device 303 may be installed at the middle or lower portion of the center fascia 311 or may be installed at an inner surface of the front window 19a or on the top of the dashboard 310 using a separate supporter. In addition, the on-vehicle display device 303 may be installed at various positions that may be considered by a designer.

Various kinds of devices such as a processor, a communication module, a Global Positioning System (GPS) module, and a storage device may be installed inside the dashboard. The processor installed in the vehicle 1 may be provided to control various types of electronic devices installed in the vehicle 1. As described above, the processor may be provided to perform a function of the controller 100. The above-mentioned devices may be implemented with various components such as a semiconductor chip, a switch, an integrated circuit, a resistor, a volatile or non-volatile memory, and a printed circuit board.

The center fascia 311 may be installed at the center of the dashboard 310 and may be provided with input units 312 to 314 for entering various types of commands associated with the vehicle 1. The input units 312 to 314 may be implemented with a physical button, a knob, a touch pad, a touch screen, a stick-type manipulation device, or a trackball. A driver may control various kinds of operations of the vehicle 1 by manipulating the input units 312 to 314 and input units 318 and 319.

The gear box 315 is provided under the center fascia 311 and between the driver seat 301 and the passenger seat 302. The gear box 315 may be provided with a gear 316, a compartment box 317, various kinds of input units 318 and 319, and the like. The input units 318 and 319 may be implemented with a physical button, a knob, a touch pad, a touch screen, a stick-type manipulation device, or a trackball. The compartment box 317 and the input units 318 and 319 may not be provided depending on embodiments.

The steering wheel 320 and the instrument panel 330 are provided on a driver's side of the dashboard 310.

The steering wheel 320 may be provided to be rotatable in a certain direction according to a driver's manipulation. The vehicle 1 may be steered by rotating front wheels or rear wheels of the vehicle 1 according to a rotational direction of the steering wheel 320. The steering wheel 320 is provided with a spoke 321 connected to a rotary shaft and a handle wheel 322 coupled to the spoke 321. The spoke 321 may be provided with an input unit for entering various types of commands, and the input unit may be implemented with a physical button, a knob, a touch pad, a touch screen, a stick-type manipulation device, or a trackball. The handle wheel 322 may have a circular shape for a driver's convenience, but is not limited thereto. A vibrating unit 201 (see FIG. 4) may be installed inside at least one of the spoke 321 and the handle wheel 322 to vibrate the at least one of the spoke 321 and the handle wheel 322 at a predetermined intensity according to external control. Depending on embodiments, the vibrating unit 201 may vibrate at various intensities according to an external control signal. Thus, the at least one of the spoke 321 and the handle wheel 322 may be vibrated at various intensities according to an external control signal. The vehicle 1 may provide a haptic warning to a driver by using the vibrating unit 201. For example, the vehicle 1 may provide various warnings to a driver by vibrating the at least one of the spoke 321 and the handle wheel 322 according to a predetermined risk level when the vehicle 1 changes lanes. In detail, as the risk level increases, an intensity of vibration of the at least one of the spoke 321 and the handle wheel 322 also increases, and thus the vehicle 1 may provide a high level of warning to a driver.

The instrument panel 330 provides a driver with various kinds of information associated with the vehicle 1 such as speed, an engine RPM, a residual fuel quantity, an engine oil temperature, whether an indicator is blinking, and a vehicle traveling distance. The instrument panel 330 may be implemented with a lighting lamp and a scale board and also may be implemented with a display panel depending on embodiments. When the instrument panel 330 is implemented with a display panel, the instrument panel 330 may display a greater variety of information, such as fuel efficiency, whether various kinds of functions installed in the vehicle 1 are performed, etc., in addition to the above-mentioned information to provide the information to a driver. Also, according to an embodiment, the instrument panel 330 may output different warnings according to a risk level of the vehicle 1 to a driver. In detail, when the vehicle 1 changes lanes, the instrument panel 330 may provide different warnings to a driver according to the predetermined risk level.

A rear-view mirror 340 may be provided at an upper portion of the inside of the vehicle 1, and a driver may view a rear side of the vehicle 1 or the passenger compartment 300 of the vehicle 1 through the rear-view mirror 340.

As described above, at least one imaging device 350 may be provided inside the vehicle 1. While FIG. 2 shows an example in which the imaging device 350 is provided in the vicinity of the rear-view mirror 340, imaging device there are no restrictions on the place at which the imaging device 350 is installed. Accordingly, the imaging device 350 may be mounted on any place as long as the imaging device 350 images the inside or outside of the vehicle 1 to acquire image information. The imaging device 350 may capture surrounding images of the vehicle 1 while the vehicle 1 is running or parked and may acquire location information of a pedestrian near the vehicle 1.

The imaging device 350 may include at least one camera and may further include a three-dimensional (3D) space recognition sensor, a radar sensor, an ultrasonic sensor, and the like in order to capture a more accurate image.

Example of the 3D space recognition sensor may include a Kinect camera (RGB-D sensor), a time-of-flight (ToF) camera, a stereo camera, or the like, but is not limited thereto. The 3D space recognition sensor may include other devices capable of performing similar functions.

Figure 3:
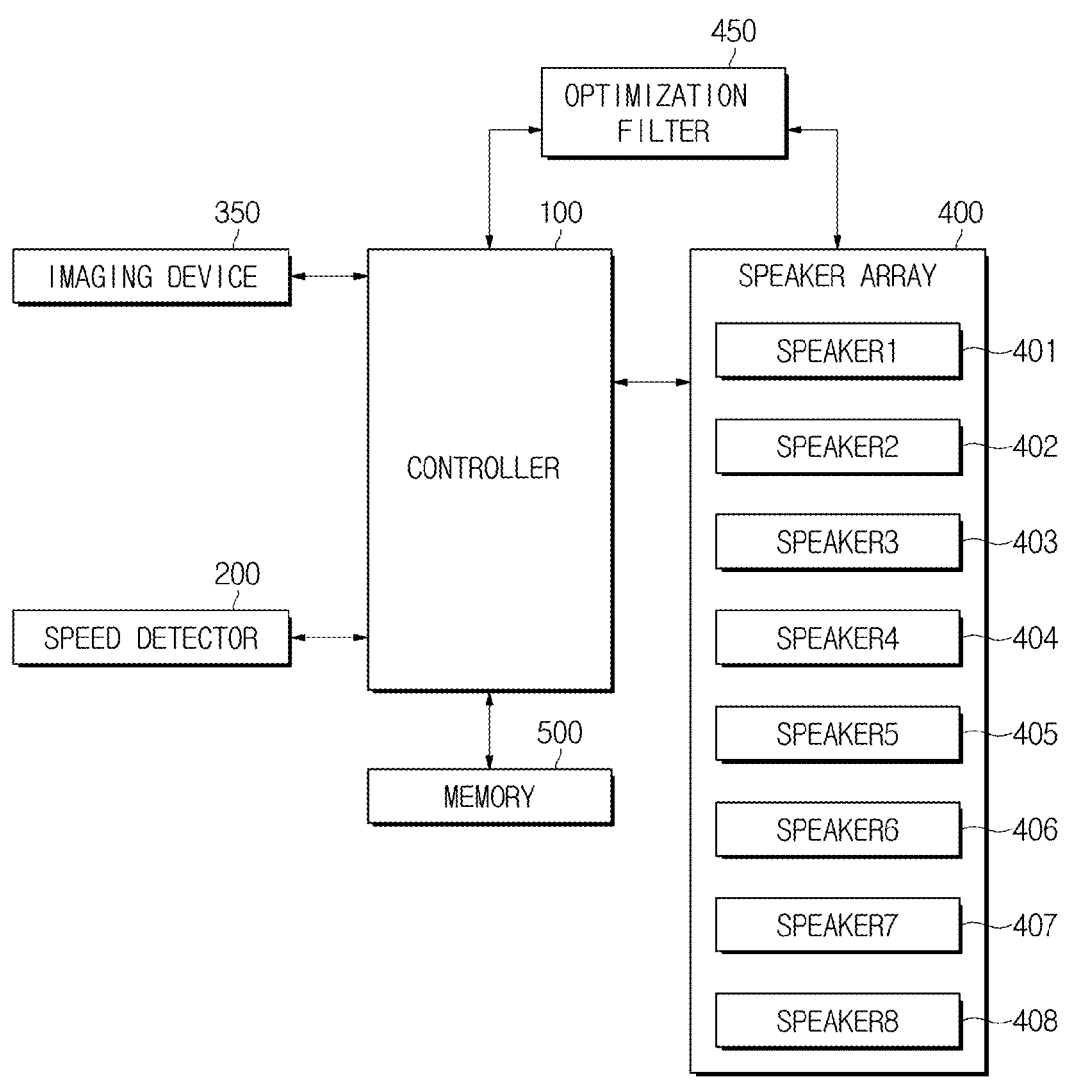
FIG. 3 is a control block diagram of a vehicle according to an embodiment.

FIG. 3 is a control block diagram of a vehicle according to an embodiment.

Referring to FIG. 3, the vehicle 1 according to an embodiment may include the controller 100 configured to control components of the vehicle 1 and generate a control signal for controlling warning sounds output to a pedestrian, a speed detector 200 configured to detect a traveling speed of the vehicle 1, which is driven by a driver, the imaging device 350 configured to capture surrounding images of the vehicle 1 and acquire location information of the pedestrian, a speaker array 400 configured to output warning sounds in a direction in which the pedestrian is located near the vehicle 1, an optimization filter 450 configured to optimize the control signal generated by the controller 100 so that the warning sounds output by the speaker array 400 are effectively delivered to the pedestrian, and a memory 500 configured to store data associated with the control of the vehicle 1.

The speed detector 200 may detect a traveling speed of the vehicle 1 driven by a driver under control of the controller 100. That is, the speed detector 200 may detect the traveling speed by using a rotational speed of wheels of the vehicle 1, and the traveling speed may be expressed in km/h, which indicates a rate of distance (km) covered per unit time (h).

As shown in FIGS. 1 and 2, the imaging device 350 may be provided inside the vehicle 1 to image the inside or the outside of the vehicle 1, capture surrounding images of the vehicle 1 while the vehicle 1 is running or parked, and acquire location information of the pedestrian. The imaging device 350 may include at least one camera and may further include a 3D space recognition sensor, a radar sensor, an ultrasonic sensor, and the like in order to capture an accurate image of the pedestrian.

The imaging device 350 may capture an image of a pedestrian to acquire coordinate information of the pedestrian with respect to the vehicle 1 and may deliver the acquired coordinate information of the pedestrian to the controller 100.

Since the pedestrian moves near the vehicle 1, coordinates and speed of the pedestrian vary in real time. In addition, since the vehicle 1 also moves, a location and speed of the vehicle 1 vary in real time. The imaging device 350 may capture an image of the pedestrian in real time while the vehicle 1 and the pedestrian are moving and may acquire location information of the pedestrian on the basis of the captured image. The location information of the pedestrian may include a movement speed of the pedestrian and coordination information indicating how far and in which direction the pedestrian is from the vehicle 1.

That is, the imaging device 350 may capture an image of a pedestrian in real time while the vehicle 1 and the pedestrian are moving and may acquire location information of the pedestrian to detect movement and a location of the pedestrian. As described below, since warning sounds may be output only in a direction in which the pedestrian is located on the basis of the location information, it is possible to prevent generation of unnecessary (undesirable) noise due to the outputting of warning sounds even to a place where there are no pedestrians.

The location information of the pedestrian acquired by the imaging device 350 may be stored in the memory 500 and may be used by the controller 100 to generate a control signal for outputting warning sounds to the pedestrian.

The controller 100 may generate a control signal for outputting warning sounds to the pedestrian through the speaker array 400. In detail, the controller 100 may generate a control signal for outputting warning sounds in a direction in which the pedestrian is located on the basis of the location information of the pedestrian acquired by the imaging device 350.

In related art, when a pedestrian is detected, the vehicle 1 just outputs warning sounds rather than outputting the warning sounds only to an area where the pedestrian is located, thus causing a problem of unnecessary noise that is generated due to the warning sounds output even to an area where the pedestrian is not present.

The controller 100 according to an embodiment can reduce generation of unnecessary noise by generating a control signal for outputting warning sounds only in a direction in which where a pedestrian is located on the basis of location information of the pedestrian acquired by the imaging device 350.

To this end, the controller 100 may control warning sounds output through the speaker array 400. That is, the controller 100 may perform control so that warning sounds are output not in all directions but only in a predetermined direction through constructive interference and destructive interference between warning sounds output by a plurality of speakers included in the speaker array 400. In this case, the controller 100 may generate a control signal for removing warning sounds output in directions in which there are no pedestrians. Since information regarding constructive interference and destructive interference between the warning sounds output by the plurality of speakers included in the speaker array 400 is preset and stored in the memory 500, the controller 100 may generate a control signal for combining the warning sounds output by the plurality of speakers on the basis of the location information of the pedestrian.

The controller 100 may calculate a distance between the vehicle 1 and the pedestrian on the basis of the location information of the pedestrian acquired by the imaging device 350 and may determine whether the pedestrian is located within a predetermined distance from the vehicle 1 on the basis of the calculated distance. When the pedestrian is located within the predetermined distance from the vehicle 1, the controller 100 may generate a control signal for outputting warning sounds. When the pedestrian is located beyond the predetermined distance from the vehicle 1 and thus the warning sounds need not be output, the controller 100 may not generate the control signal.

Also, the controller 100 may control intensities of the warning sounds output by the speaker array 400 on the basis of the distance between the vehicle 1 and the pedestrian and may calculate a time-to-collision (TTC) between the vehicle 1 and the pedestrian and control the intensities of the warning sounds output by the speaker array 400 on the basis of a result of the calculation.

TTC refers to a value obtained by measuring a distance between the vehicle 1 being operating and an external vehicle or a pedestrian and dividing the measured distance by relative speed of the two vehicles or the vehicle 1 and the pedestrian. As long as a speed of the vehicle 1 is not changed, the two vehicles or the vehicle 1 and the pedestrian will collide with each other after the calculated TTC.

Accordingly, when the calculated TTC is long, the possibility of collision between the vehicle 1 and the pedestrian is low. Accordingly, the controller 100 may output warning sounds to the pedestrian at low intensities.

That is, the controller 100 may increase the intensities of the warning sounds when the distance between the vehicle 1 and the pedestrian is short or when the TTC between the vehicle 1 and the pedestrian is short.

When a plurality of pedestrians are located near the vehicle 1, the controller 100 may generate a control signal for outputting warning sounds in directions in which the plurality of pedestrians are respectively located or to an area where the plurality of pedestrians are located. That is, the controller 100 may output warning sounds to each of the plurality of pedestrians or to the entire area where the plurality of pedestrians are included.

Also, the controller 100 may control the intensities of the warning sounds output by the speaker array 400 on the basis of location information of the plurality of pedestrians.

The controller 100 may determine pedestrian distribution density of the area where the plurality of pedestrians are located on the basis of the location information of the pedestrians acquired by the imaging device 350. That is, the controller 100 may determine whether the pedestrian distribution density is high or low by comparing the number of location coordinates in a certain area with predetermined data on the basis of the acquired location information of the pedestrians. After determining the pedestrian distribution density, the controller 100 may control the intensities of the warning sounds output to the area where the pedestrians are located. That is, the controller 100 may output warning sounds to an area with high pedestrian distribution density at high intensities and output warning sounds to an area with low pedestrian distribution density at low intensities.

The controller 100 may be implemented with a memory configured to store an algorithm for controlling operations of components in the vehicle 1 or data on a program that represents the algorithm and a processor configured to perform the above-mentioned operations using the data stored in the memory. In this case, the memory and the processor may each be implemented with a separate chip. Alternatively, the memory and the processor may be implemented together with one single chip.

The speaker array 400 may output the warning sounds in the direction in which the pedestrian is located on the basis of a control signal generated by the controller 100. The speaker array 400 may be provided at the front of the vehicle 1 and include at least one speaker that outputs warning sounds.

While FIG. 3 shows an example in which the speaker array 400 includes eight speakers including first to eighth speakers 400 to 408, there are no restrictions on the number of speakers included in the speaker array 400.

Each of the plurality of speakers included in the speaker array 400 may output warning sounds, and an output pattern or an output time of the warning sounds may be changed according to a control signal generated by the controller 100. That is, constructive interference and destructive interference may occur between the warning sounds output by the plurality of speakers included in the speaker array 400 because of a phase difference between the warning sounds. Because of the constructive interference and destructive interference, the warning sounds may be output only in a direction in which a pedestrian is located.

The warning sounds output by the speaker array 400 may be output at the same time using a plurality of beams instead of a simple beep in consideration of the location of the pedestrian and surrounding environments. The speaker array 400 may use the plurality of speakers to output warning sounds to only a designated point or output different warning sounds to a plurality of pedestrians at the same time. Thus, it is possible to reduce noise generated due to unnecessary warning sounds.

Figure 4:
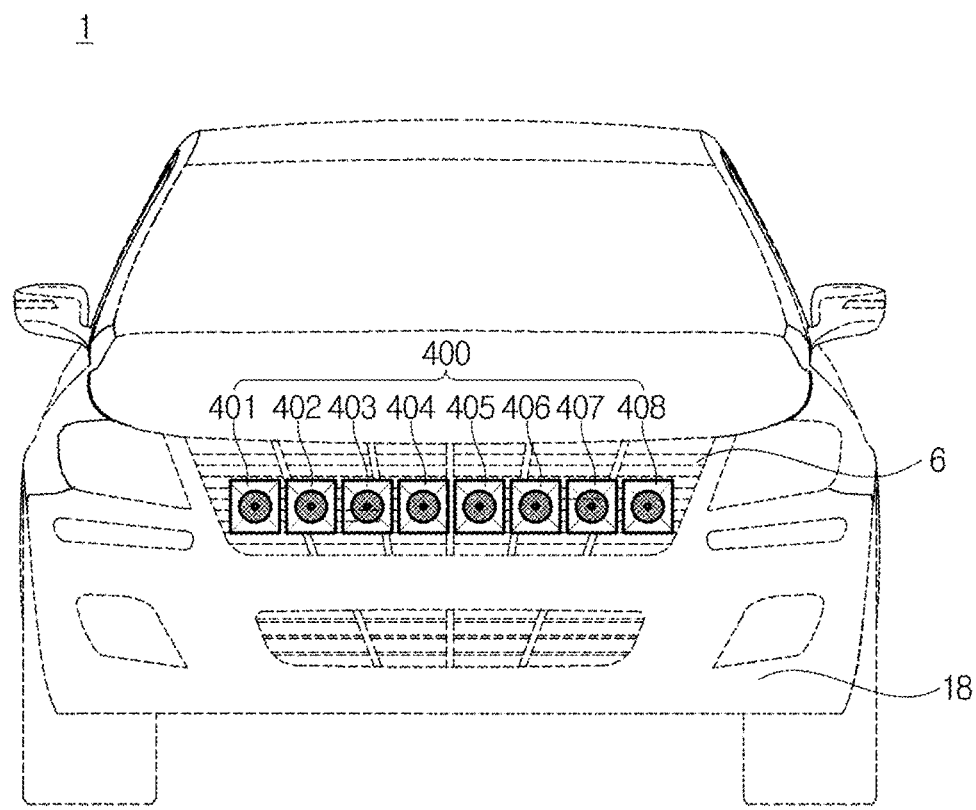
FIG. 4 is a perspective view showing an example in which a speaker array composed of eight speakers is provided at a radiator grill of a vehicle according to an embodiment.
Figure 5:
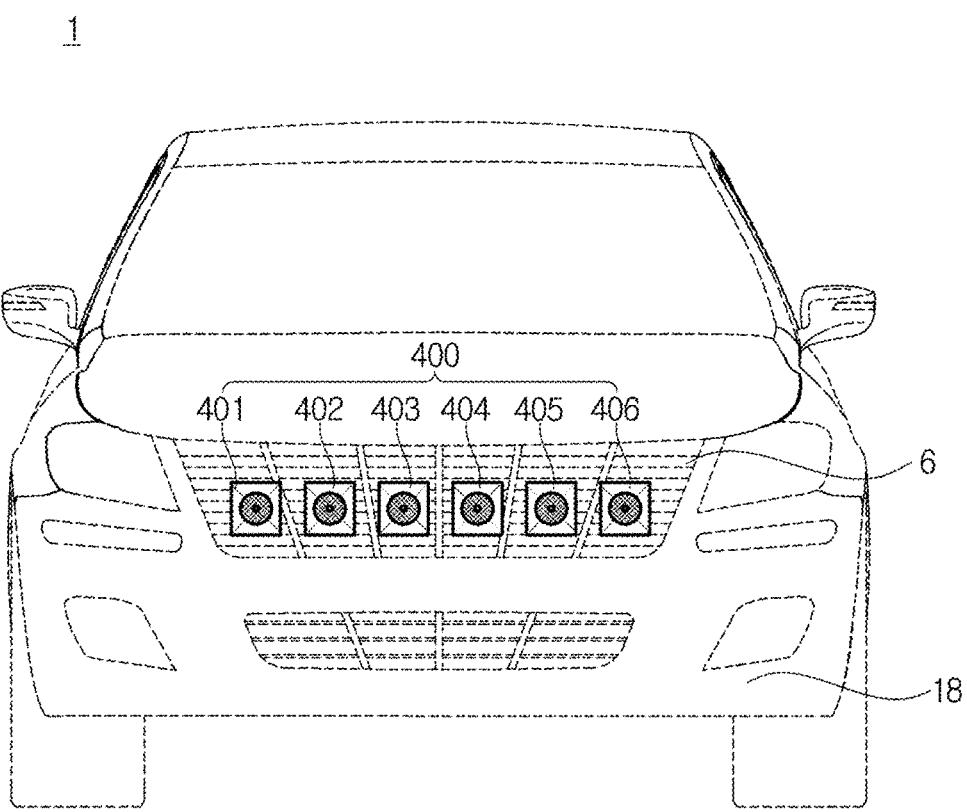
FIG. 5 is a perspective view showing an example in which a speaker array composed of six speakers is provided at a radiator grill of a vehicle according to an embodiment.
Figure 6:
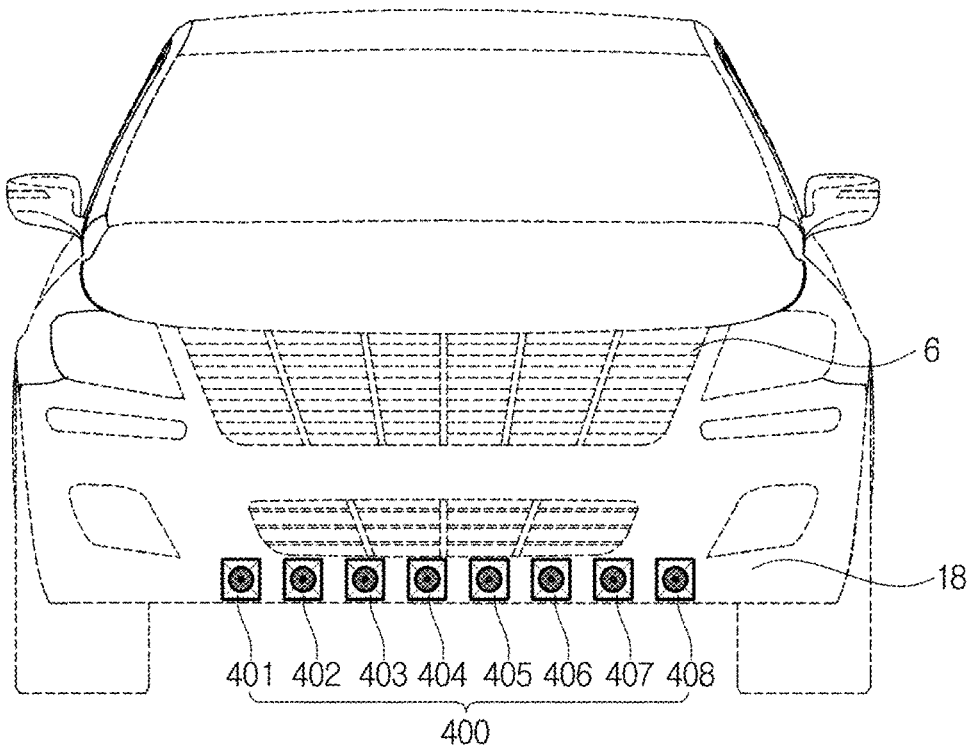
FIG. 6 is a perspective view showing an example in which a speaker array is provided at a lower portion of a front bumper of a vehicle according to an embodiment.
Figure 7:
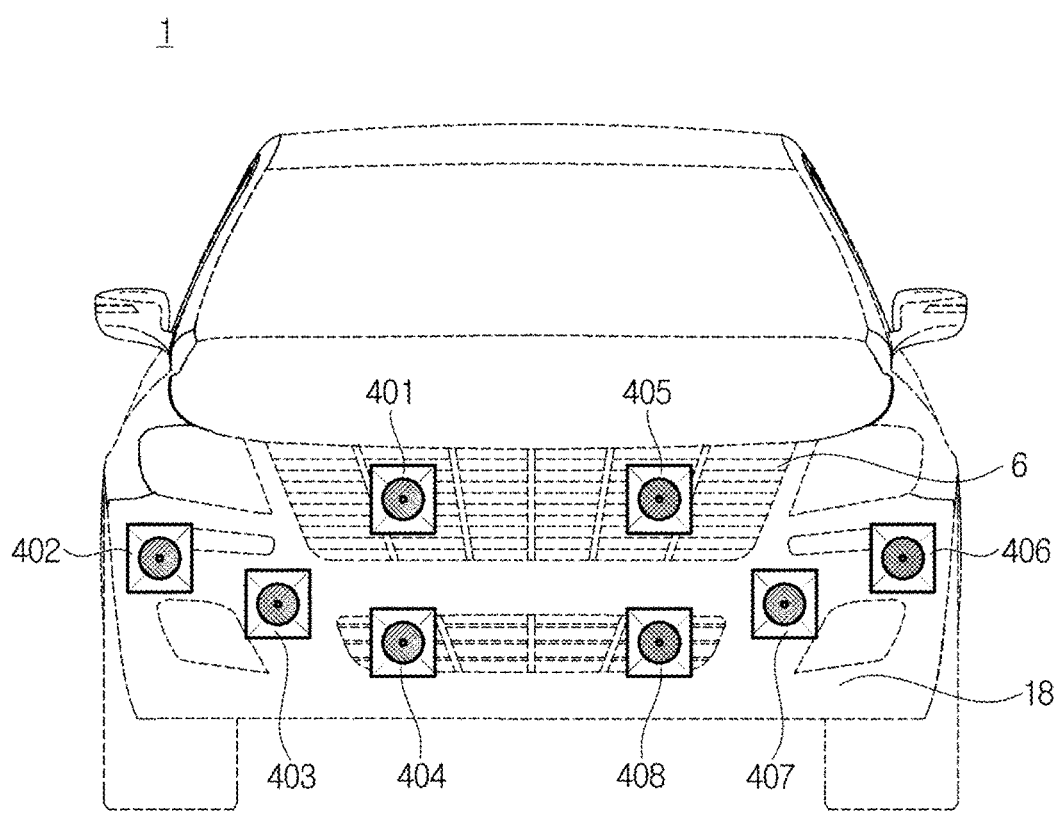
FIGS. 7 and 8 are perspective views each showing an example in which a speaker array is provided at a radiator grill or a front bumper of a vehicle according to an embodiment.
Figure 8:
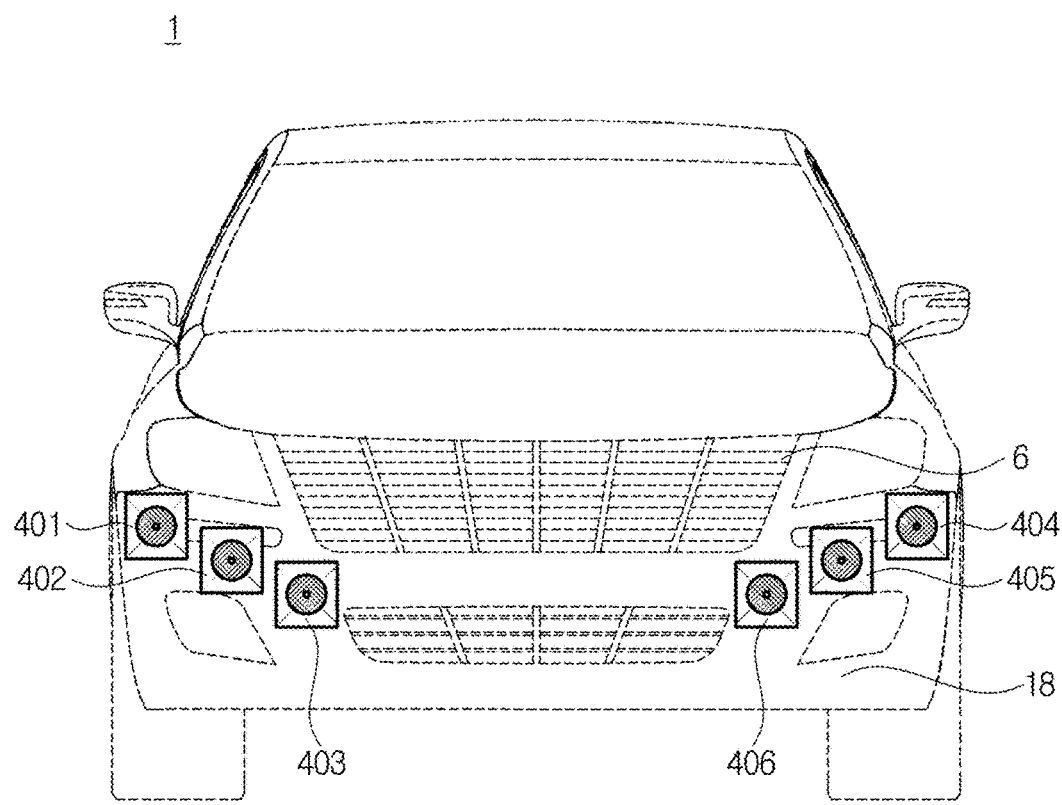

FIG. 4 is a perspective view showing an example in which a speaker array composed of eight speakers is provided at a radiator grill of a vehicle according to an embodiment, and FIG. 5 is a perspective view showing an example in which a speaker array composed of six speakers is provided at a radiator grill of a vehicle according to an embodiment. FIG. 6 is a perspective view showing an example in which a speaker array is provided at a lower portion of a front bumper of a vehicle according to an embodiment, and FIGS. 7 and 8 are perspective views each showing an example in which a speaker array is provided at a radiator grill or a front bumper of a vehicle according to an embodiment.

Referring to FIG. 4, the speaker array 400 may be provided at the radiator grill 6 of the vehicle 1. That is, the speaker array 400 may be composed of first to eighth speakers 401 to 408. As shown in FIG. 4, the plurality of speakers 401 to 408 may be arranged in a row or other shapes. An arrangement interval of the plurality of speakers may be different according to various embodiments that are implemented. The plurality of speakers may be provided at the front of the radiator grill 6 to output warning sounds in a forward direction of the vehicle 1.

Each of the plurality of speakers included in the speaker array 400 may output warning sounds under control of the controller 100, and constructive interference or destructive interference may occur between the warning sounds output by the plurality of speakers according to a control signal generated by the controller 100. Also, intensities of the warning sounds output by the plurality of speakers may increase or decrease under control of the controller 100.

While a pedestrian is walking, the pedestrian can hear the warning sounds output from the speaker array 400 provided in the vehicle 1 and notice the approach of the vehicle 1.

The number of speakers included in the speaker array 400 may be eight as shown in FIG. 4 or six as shown in FIG. 5. There are no restrictions on the number of speakers constituting the speaker array 400, and there may be various embodiments depending on a method of combining the warning sounds output by the speakers.

Referring to FIG. 6, the speaker array 400 may be provided at a lower portion of the front bumper 18 of the vehicle 1. That is, the speaker array 400 may be composed of first to eighth speakers 401 to 408. As shown in FIG. 6, the plurality of speakers 401 to 408 may be arranged in a row or other shapes. According to various embodiments, an arrangement interval of the plurality of speakers may be different according to various embodiments. The plurality of speakers may be provided at the lower portion of the front bumper 18 to output warning sounds in a forward direction of the vehicle 1.

Although in FIG. 6, the number of speakers included in the speaker array 400 that are provided at the lower portion of the front bumper 18 of the vehicle 1 may be eight as shown in FIG. 6 or six in another case. There are no restrictions on the number of speakers constituting the speaker array 400 provided at the lower portion of the front bumper 18 of the vehicle 1, and there may be various embodiments depending on a method of combining the warning sounds output by the speakers.

The speaker array 400 may be provided at the front bumper 18 or the radiator grill 6 of the vehicle 1. That is, as shown in FIG. 7, three speakers of the speaker array 400 may be provided at a lower right portion of the front bumper 18, three speakers of the speaker array 400 may be provided at a lower left portion of the front bumper 18, and two speakers of the speaker array 400 may be provided at the radiator grill 6.

Alternatively, as shown in FIG. 8, three speakers of the speaker array 400 may be provided at a lower right portion of the front bumper 18, three speakers of the speaker array 400 may be provided at a lower left portion of the front bumper 18, and no speakers may be provided at the radiator grill 6.

The plurality of speakers included in the speaker array 400 provided at the front bumper 18 or the radiator grill 6 may be arranged in a row or other shapes. Also, the plurality of speakers may have a different arrangement interval and arrangement shape according to various embodiments and may output warning sounds in the forward direction of the vehicle 1.

As shown in FIG. 7, by placing some of the plurality of speakers at the front bumper 18 and the others at the radiator grill 6, the controller 100 may generate a control signal for enabling constructive interference and destructive interference to occur between the warning sounds output by the speakers.

Referring to FIG. 3 again, the optimization filter 450 may optimize a control signal generated by the controller 100 so that the warning sounds output by the speaker array 400 are efficiently delivered to a pedestrian. That is, the controller 100 generates a control signal for enabling the speaker array 400 to output warning sounds only in a direction in which the pedestrian is located. The control signal enables constructive interference to occur between the warning sounds output in the direction in which the pedestrian is located and also enables destructive interference to occur between warning sounds output in directions in which there are no pedestrians.

In this case, when the controller 100 generates a control signal for enabling constructive interference to occur between the warning sounds output in the direction in which the pedestrian is located, destructive interference does not occur between the warning sounds output in the directions in which there are no pedestrians, and thus the warning sounds may still be present. On the other hand, when the controller 100 generates a control signal to enable destructive interference to occur between the warning sounds output in the directions in which there are no pedestrians, constructive interference does not occur between the warning sounds output in the direction in which the pedestrian is located, and thus the warning sounds may be weakened.

On the basis of an optimization algorithm for a control signal generated by the controller 100, the optimization filter 450 may optimize the control signal generated by the controller 100 so that constructive interference occurs without destruction between the warning sounds output in the direction in which the pedestrian is located and may optimize the control signal generated by the controller 100 so that destructive interference occurs without construction between the warning sounds output in the directions in which there are no pedestrians.

The memory 500 may store data associated with control of the vehicle 1 according to an embodiment. That is, the memory 500 may store the location information of the pedestrian acquired by the imaging device 350 and may store data associated with the control signal that is generated by the controller 100 to output the warning sounds in the direction in which the pedestrian is located.

Also, the memory 500 may store data regarding the distance between the vehicle 1 and the pedestrian that is calculated by the controller 100, data regarding the predetermined distance between the vehicle 1 and the pedestrian in order to output warning sounds, and data regarding a TTC between the vehicle 1 and the pedestrian that is calculated by the controller 100.

The memory 500 may store data regarding intensities of the warning sounds that are output by the speaker array 400 on the basis of the distance between the vehicle 1 and the pedestrian and also may store data regarding intensities of the warning sounds that are output by the speaker array 400 on the basis of the TTC between the vehicle 1 and the pedestrian.

The memory 500 may be implemented with at least one of a non-volatile memory device such as a cache, a read-only memory (ROM), a programmable ROM, an erasable programmable ROM (EPROM), an electrically erasable programmable ROM (EEPROM), a flash memory, a volatile memory device such as a random access memory (RAM), and a storage medium such as a hard disk drive (HDD) and a CD-ROM, etc., but is not limited thereto. The memory 500 may be a memory that is implemented with a separate chip different from that of the processor that has been described in association with the controller. Alternatively, the memory and the processor may be implemented together with one single chip.

Figure 9:
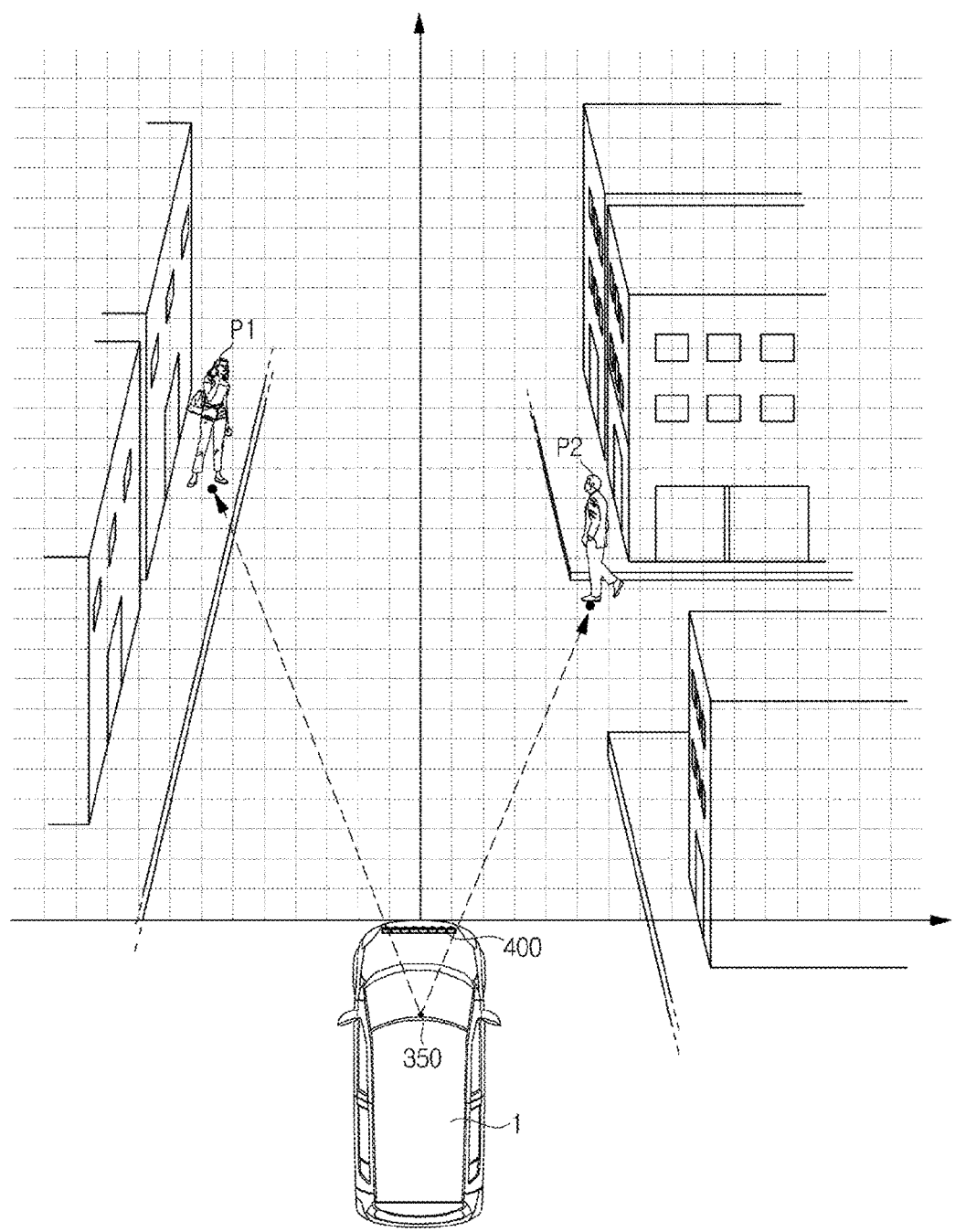
FIG. 9 is a conceptual view showing an example of acquiring location information of a pedestrian according to an embodiment.

FIG. 9 is a conceptual view showing an example of acquiring location information of a pedestrian according to an embodiment.

As shown in FIG. 9, the imaging device 350 of the vehicle 1 may capture an image of a pedestrian and acquire location coordinates of the pedestrian. In this case, the imaging device 350 may acquire coordinate information of the pedestrian with respect to the vehicle 1.

The imaging device 350 may acquire coordination information of a plurality of pedestrians. Referring to FIG. 9, when there are two pedestrians, the imaging device 350 may acquire coordinate information of a first pedestrian P1 and a second pedestrian P2 with respect to a current location of the vehicle while the vehicle 1 is traveling. The coordinate information of the plurality of pedestrians acquired by the imaging device 350 may be delivered to the controller 100 and stored in the memory 500.

Also, when coordinates and speed of a pedestrian near the vehicle 1 vary with movement of the pedestrian in real time, the imaging device 350 may capture an image of the pedestrian in real time and may update location information of the pedestrian in real time on the basis of the captured image.

Also, the controller 100 may determine pedestrian distribution density of the area where the plurality of pedestrians are located on the basis of the location information of the pedestrians acquired by the imaging device 350. While FIG. 9 shows an example in which coordinate information of the first and second pedestrians P1 and P2 is acquired, the imaging device 350 may acquire location information of a plurality of pedestrians where the plurality of pedestrians are present. The controller 100 may determine whether distribution density of the plurality of pedestrians is high or low by comparing the number of location coordinates in a certain area with predetermined data on the basis of the location information of the plurality of pedestrians acquired by the imaging device 350.

FIG. 10 is a conceptual view showing an example in which a speaker array outputs warning sounds to a pedestrian according to an embodiment, and FIG. 11 is a conceptual view showing an example in which a speaker array outputs warning sounds to an area within a predetermined distance from a pedestrian according to an embodiment.

Referring to FIG. 10, the imaging device 350 may capture an image of a pedestrian P3 and acquire location information of the pedestrian P3, and the controller 100 may generate a control signal for outputting warning sounds only in a direction in which the pedestrian P3 is located on the basis of the acquired location information of the pedestrian P3.

That is, the imaging device 350 may acquire coordinate information of the pedestrian P3 on the basis of the location of the vehicle 1, and the controller 100 may calculate a distance between the vehicle 1 and the pedestrian P3 on the basis of the acquired coordinate information of the pedestrian P3. When the calculated distance between the vehicle 1 and the pedestrian P3 is less than or equal to a predetermined distance, the controller 100 may generate a control signal for outputting the warning sounds only in the direction in which the pedestrian P3 is located.

Referring to FIG. 10, the speaker array 400 may output warning sounds in a forward direction of the vehicle 1. In this case, unnecessary noise may be generated when the warning sounds are also output in directions in which the pedestrian P3 is not located. Accordingly, the controller 100 may generate a control signal for outputting warning sounds only in a direction Z8 in which the pedestrian P3 is located rather than in directions Z1 to Z7 in which the pedestrian P3 is not located.

In order to output the warning sounds only in the direction in which the pedestrian P3 is located, the controller 100 may control the warning sounds output by the plurality of speakers included in the speaker array 400.

That is, as described above, by combining control signals for the warning sounds output by the plurality of speakers to enable destructive interference to occur between the warning sounds output in the directions Z1 to Z7 in which the pedestrian P3 is not located so that the warning sounds may be removed and enable constructive interference to occur between the warning sounds output in the direction Z8 in which the pedestrian P3 is located so that the warning sounds may be amplified, it is possible to effectively output the warning sounds in the direction Z8 in which the pedestrian P3 is located.

Data regarding the combination of the control signals in order to output the warning sounds only in the direction Z8 in which the pedestrian P3 is located rather than in directions Z1 to Z7 in which the pedestrian P3 is not located may be preset and stored in the memory 500.

As shown in FIG. 10, since the speaker array 400 provided in the vehicle 1 may output warning sounds only in the direction Z8 in which the pedestrian P3 is located rather than in directions Z1 to Z7 in which the pedestrian P3 is not located, it is possible to inform only the pedestrian P3 about the approach of the vehicle 1 and also reduce generation of unnecessary noise in the directions Z1 to Z7 in which the pedestrian P3 is not located.

Referring to FIG. 11, the controller 100 may generate a control signal for outputting warning sounds in an area within a predetermined distance from pedestrian P4 on the basis of location information of the pedestrian P4 acquired by the imaging device 350. That is, the controller 100 may generate a control signal for enabling the speaker array 400 to output warning signal to an area surrounding the pedestrian in consideration of surrounding environments and ambient noise as well as generating a control signal for enabling the speaker array 400 to output the warning sounds only in the direction in which the pedestrian is located.

As shown in FIG. 11, the controller 100 may generate a control signal for outputting warning sounds in an area Z9 within a predetermined distance from the pedestrian P4 on the basis of the location information of the pedestrian P4 acquired by the imaging device 350, and the speaker array 400 may output the warning sounds to the area surrounding the pedestrian P4 as well as in the direction in which the pedestrian P4 is located.

The area Z9 within the predetermined distance from the location of the pedestrian P4 is an area that is set on the basis of data prestored in the memory, and the area may be larger or smaller depending on the case.

Other pedestrians located adjacent to the pedestrian P4 may be aware of the warning sounds and also may be less affected by ambient noise due to the outputting of the warning sounds even to the area Z9 within the predetermined distance from the location of the pedestrian P4.

Figure 13:
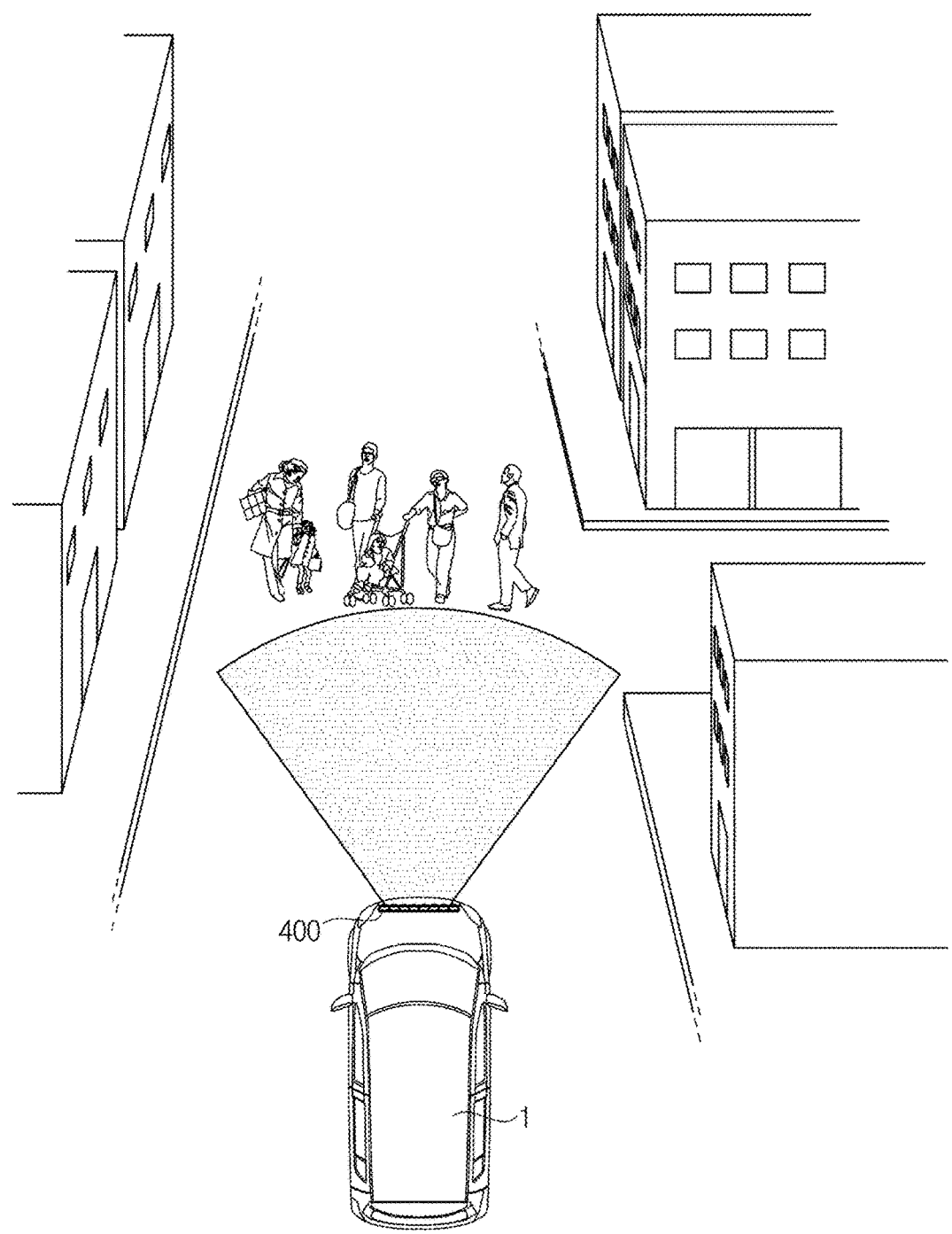
FIG. 13 is a conceptual view showing an example in which a speaker array outputs warning sounds to the entirety of a designated area.

FIG. 12 is a conceptual view showing an example in which a speaker array outputs warning sounds to a plurality of pedestrians according to an embodiment, and FIG. 13 is a conceptual view showing an example in which a speaker array outputs warning sounds to the entirety of a designated area.

Referring to FIG. 12, the imaging device 350 may capture an image of a plurality of pedestrians P5, P6, and P7 and acquire location information of the pedestrians P5, P6, and P7, and the controller 100 may generate a control signal for outputting warning sounds only in directions in which the pedestrians P5, P6, and P7 are located on the basis of the acquired location information of the pedestrians P5, P6, and P7.

That is, the imaging device 350 may acquire coordinate information of the plurality of pedestrians P5, P6, and P7 with respect to the location of the vehicle 1, and the controller 100 may calculate distances between the vehicle 1 and the pedestrians P5, P6, and P7 on the basis of the acquired coordinate information of the pedestrians P5, P6, and P7. When the calculated distances between the vehicle 1 and the pedestrians P5, P6, and P7 are less than or equal to a predetermined distance, the controller 100 may generate a control signal for outputting warning sounds only in the directions in which the pedestrians P5, P6, and P7 are located.

Like in FIG. 10, the controller 100 may output warning sounds only in the directions in which the plurality of pedestrians P5, P6, and P7 are located rather than in directions in which the plurality of pedestrians P5, P6, and P7 are not located, thus informing only the pedestrians P5, P6, and P7 about the approach of the vehicle 1 and also reducing generation of unnecessary noise in the directions in which the pedestrians P5, P6, and P7 are not located.

The controller 100 may calculate distances between the vehicle 1 and the plurality of pedestrians P5, P6, and P7 and may control intensities of the warning sounds output by the speaker array 400 on the basis of the calculated distances. That is, the controller 100 may increase intensities of warning sounds output to a pedestrian close to the vehicle 1 among the plurality of pedestrians P5, P6, and P7 and may decrease intensities of warning sounds output to a pedestrian far from the vehicle 1.

While FIGS. 10 to 12 show examples in which the speaker array 400 output warnings signals in a direction in which a pedestrian is located under control of the controller 100, the speaker array 400 may output the warning sounds to the entirety of a designated area rather than only in a designated direction, as shown in FIG. 13.

That is, when a plurality of pedestrians are located near the vehicle 1, in particular, when it is determined that there are many pedestrians distributed over a large area on the basis of location information of the plurality of pedestrians acquired by the imaging device 350, the controller 100 may generate a control signal for outputting warning sounds in all forward directions of the vehicle 1 rather than only in a designated direction.

A plurality of pedestrians who form a group as shown in FIG. 13 may notice the approach of the vehicle 1 through warning sounds output by the speaker array 400.

As shown in FIG. 13, when a plurality of pedestrians are located near the vehicle 1, the controller 100 may determine pedestrian distribution density of an area where the plurality of pedestrians are located on the basis of location information of the plurality of pedestrians acquired by the imaging device 350. That is, when a plurality of pedestrians are located in a certain area to form a group, the controller may compare the number of location coordinates of the pedestrians located in the certain area with predetermined data to determine whether distribution density of the plurality of pedestrians located in the certain area is high or low.

After determining the pedestrian distribution density, the controller 100 may control the intensities of the warning sounds output to the area where the pedestrians are located. That is, the controller 100 may output warning sounds to an area with high pedestrian distribution density at high intensities and output warning sounds to an area with low pedestrian distribution density at low intensities.

Also, the controller 100 may control the range of warning sounds output to an area where the pedestrian are located on the basis of the pedestrian distribution density. That is, the controller 100 may output warning sounds to the area with high pedestrian distribution density over a wide range and output warning sounds to the area with low pedestrian distribution density over a narrow range.

Like in FIG. 13, when a plurality of pedestrians are distributed to form a group in an area, the controller 100 may perform control such that warning sounds are output to the entirety of the area over which the pedestrians are distributed. That is, the controller 100 may generate a control signal for outputting warning sounds in all forward directions of the vehicle 1 like in FIG. 13, rather than generating a control signal for outputting warning sounds only in a designated direction like in FIG. 12.

Also, when a plurality of pedestrians are distributed to form several groups in some areas, the controller 100 may generate a control signal for outputting warning sounds to the multiple areas in which the pedestrians are grouped.

Figure 14:
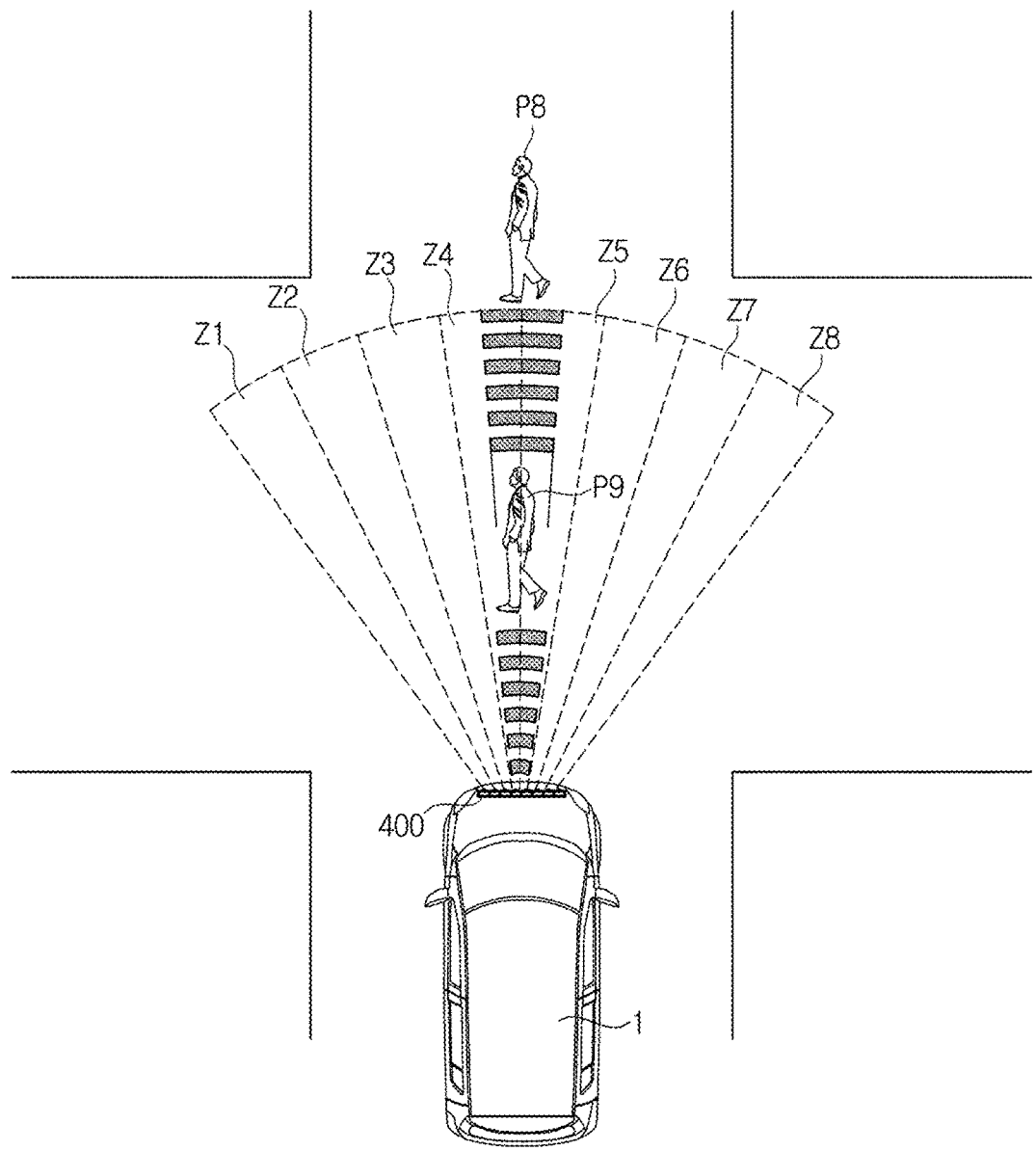
FIG. 14 is a conceptual view showing an example of controlling intensities of warning sounds on the basis of a distance between a vehicle and a pedestrian according to an embodiment.

FIG. 14 is a conceptual view showing an example of controlling intensities of warning sounds on the basis of a distance between a vehicle and a pedestrian according to an embodiment.

Referring to FIG. 14, the controller 100 may calculate a distance between the vehicle 1 and a pedestrian on the basis of location information of the pedestrian acquired by the imaging device 350 and may perform control on the basis of the calculated distance and data stored in the memory 500 so that warning sounds are output when the distance between the vehicle 1 and the pedestrian is less than or equal to a predetermined distance.

Also, the controller 100 may control the intensities of the warning sounds output by the speaker array 400 on the basis of the distance between the vehicle 1 and the pedestrian. That is, as shown in FIG. 14, when a pedestrian P9 in front of the vehicle 1 is closer to the vehicle 1 than another pedestrian P8, the pedestrian P9 has a higher risk of collision with the vehicle 1 than the pedestrian P8. Accordingly, the controller 100 may increase intensities of warning sounds output to the pedestrian P9. On the other hand, the controller 100 may decrease intensities of warning sounds output to the pedestrian P8 relatively far from the vehicle 1.

That is, when a plurality of pedestrians are located near the vehicle 1, the controller 100 may output warning sounds to nearby pedestrians at high intensities and output warning sounds to distant pedestrians at low intensities on the basis of distances between the vehicle 1 and the plurality of pedestrians, thus preventing generation of unnecessary noise while efficiently delivering the warning sounds.

Although, the controller 100 may calculate a TTC between the vehicle 1 and a pedestrian and may control intensities of the warning sounds output by the speaker array 400 on the basis of the calculated TTC. When the calculated TTC is long, the possibility of collision between the vehicle 1 and the pedestrian is low. In this case, the controller 100 may output warning sounds to the pedestrian at low intensities.

Figure 15:
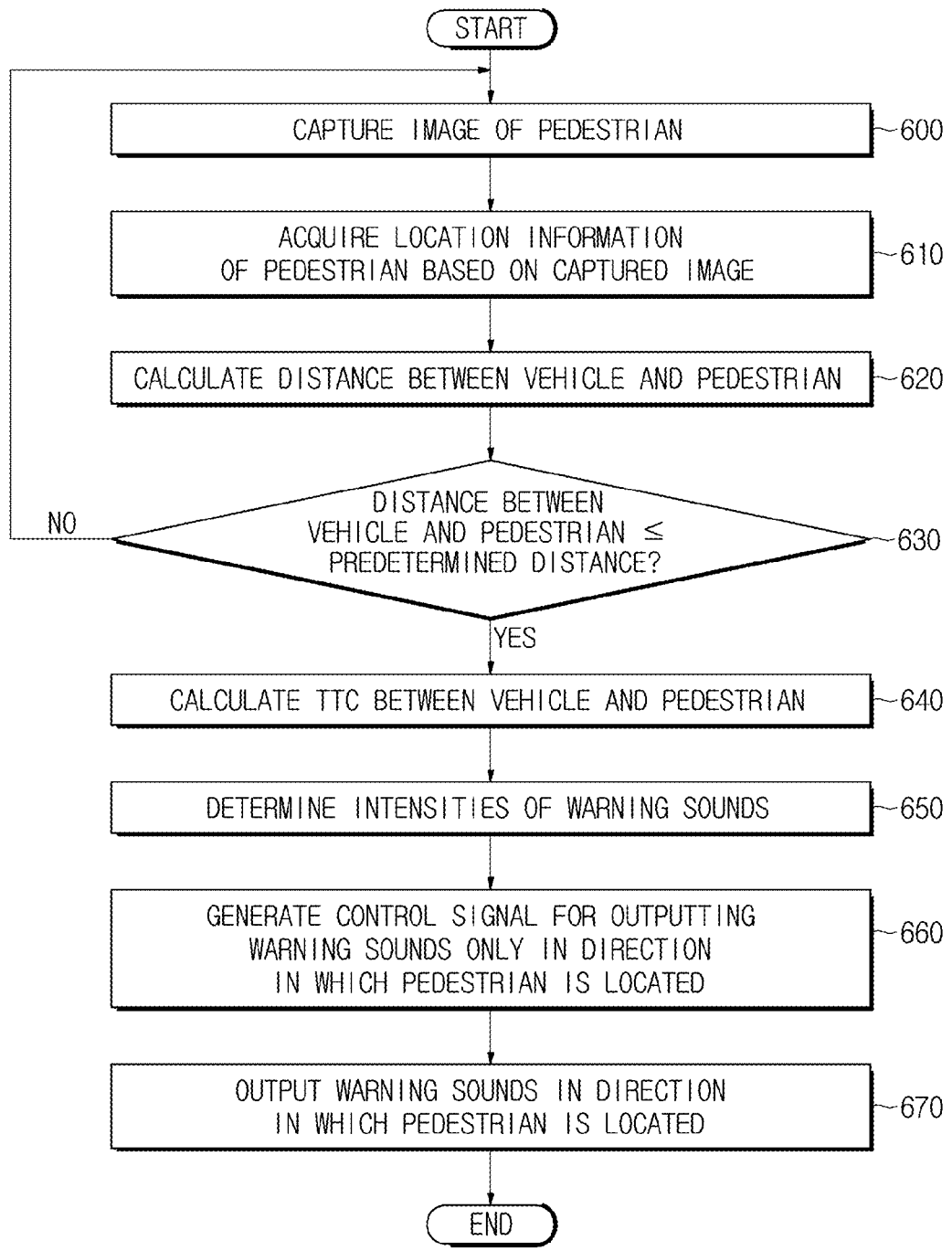
FIG. 15 is a flowchart showing a vehicle control method according to an embodiment.

FIG. 15 is a flowchart showing a vehicle control method according to an embodiment.

Referring to FIG. 15, the imaging device 350 may capture an image of a pedestrian near the vehicle 1 that is running or parked (600) and may acquire location information of the pedestrian on the basis of the captured image (610). In this case, when there are a plurality of pedestrians, the imaging device 350 may acquire location information of the plurality of pedestrians, and the location information may include coordinate information of the pedestrians. When the pedestrian is moving, the imaging device 350 may acquire location information of the pedestrian that varies with movement of the pedestrian and may acquire coordination information and speed information of the pedestrian in real time and deliver the acquired information to the controller 100.

The controller 100 may calculate a distance between the vehicle 1 and the pedestrian on the basis of the coordinate information of the pedestrian acquired by the imaging device 350 (620). The controller 100 may compare the calculated distance between the vehicle 1 and the pedestrian with a predetermined distance on the basis of data stored in the memory 500 (630) and may calculate a TTC between the vehicle 1 and the pedestrian when the distance between the vehicle 1 and the pedestrian is less than or equal to the predetermined distance (640). The TTC may be obtained by measuring the distance between the vehicle 1 and the pedestrian on the basis of the coordinate information of the pedestrian and then dividing the measured distance by a relative speed of the vehicle 1 and the pedestrian.

The controller 100 may determine intensities of warning sounds output by the speaker array 400 on the basis of the distance and TTC between the pedestrian and the vehicle 1 (650).

That is, on the basis of the location information of the pedestrian, the controller 100 may increase the intensities of the warning sounds output by the speaker array 400 when the distance between the vehicle 1 and the pedestrian is short and, on the other hand, may decrease the intensities of the warning sounds when the distance is long. Also, the controller 100 may decrease the intensities of the warning sounds output by the speaker array 400 when the TTC between the vehicle and the pedestrian is long and, on the other hand, may increase the intensity of the warning sounds when the TTC is short.

The controller 100 may generate a control signal for outputting warning sounds only in a direction in which the pedestrian is located on the basis of the location information of the pedestrian acquired by the imaging device 350 (660), and the speaker array 400 may output the warning sounds only in the direction in which the pedestrian is located under control of the controller 100 (670). That is, it is possible to prevent generation of unnecessary noise due to warning sounds output to places where there are no pedestrians and to effectively output warning sounds to the pedestrian.

That is, the controller 100 combines control signals for warning sounds output by a plurality of speakers included in the speaker array 400 to enable destructive interference to occur between warning sounds output in directions in which no pedestrians are located so that the warning sounds may be removed and enable constructive interference to occur between warning sounds output in directions in which pedestrians are located so that the warning sounds may be amplified. Thus, it is possible to effectively output the warning sounds in the directions in which pedestrians are located.

According to an embodiment, it is possible to make it easier for pedestrians to be aware of a vehicle and thus prevent an accident in advance by capturing an image of a pedestrian near a vehicle, acquiring location information of the pedestrian in real time, and outputting warning sounds to the pedestrian based on the acquired location information.

It is also possible to reduce generation of unnecessary noise by outputting warning sounds only to a designated area where the pedestrians are located based on location information of the pedestrians.

The disclosed embodiments may be implemented in the form of a recording medium for storing instructions that are executable by a computer. The instructions may be stored in the form of program code, and may create a program module and perform operations of the disclosed embodiments when executed by a processor. The recording medium may be implemented as a computer-readable recording medium.

The computer-readable recording medium includes any type of recording medium that stores instructions that may be read by a computer. Examples of the computer-readable recording medium may include a ROM, a RAM, a magnetic tape, a magnetic disk, a flash memory, an optical data storage device, etc.

The disclosed embodiments have been described with reference to the accompanying drawings. It should be understood by those skilled in the art that various changes in form and details may be made therein. The disclosed embodiments are illustrative and should not be construed restrictively.

What is claimed is:

1. A vehicle comprising:
   an imaging device configured to capture an image and acquire location information of a pedestrian appearing in the image;
   a controller configured to generate a control signal for generating sound outputs that can cause constructive interference in a direction toward where the pedestrian is located and destructive interference in other directions based on the acquired location information of the pedestrian when the pedestrian is located within a predetermined distance from the vehicle; and
   a speaker array configured to generate sound outputs based on the control signal such that a warning sound is amplified in the direction toward where the pedestrian is located by the constructive interference and the warning sound is lessened in other directions by the destructive interference,
   wherein the controller is configured to:
      determine pedestrian distribution density of an area based on the location information of the plurality of pedestrians acquired by the imaging device,
      control the warning sound to the area such that a warning sound to an area having a higher pedestrian distribution density has a higher intensity than a warning sound to an area having a lower pedestrian distribution density, and
      control the warning sound to the area such that a warning sound to an area having a higher pedestrian distribution density is output to a wider range than a warning sound to an area having a lower pedestrian distribution density.

2. The vehicle of claim 1, wherein the imaging device is configured to acquire coordinate information of the pedestrian with respect to the vehicle by capturing the image of the pedestrian.

3. The vehicle of claim 1, wherein the controller is configured to generate a control signal for generating sound outputs to an area within a predetermined distance from the pedestrian based on the acquired location information of the pedestrian.

4. The vehicle of claim 1, wherein the controller is configured to calculate a distance between the vehicle and the pedestrian based on the acquired location information of the pedestrian.

5. The vehicle of claim 4, wherein the controller is configured to control intensity of the warning sound by the speaker array based on the calculated distance between the vehicle and the pedestrian.

6. The vehicle of claim 1, wherein the controller is configured to generate a control signal for removing a warning sound in a direction toward where the pedestrian is not located.

7. The vehicle of claim 1, wherein the speaker array is provided at the front of the vehicle and includes at least one speaker configured to output warning sounds.

8. The vehicle of claim 1, wherein the controller is configured to control intensity of the warning sound output by the speaker array based on location information of the plurality of pedestrians.

9. The vehicle of claim 1, wherein the controller is configured to calculate a time-to-collision (TTC) between the vehicle and the pedestrian and further configured to control intensity of the warning sound output by the speaker array based on the calculated time-to-collision.

10. A method for controlling a vehicle comprising:
    capturing an image of a pedestrian;
    acquiring location information of the pedestrian based on the captured image;
    generating a control signal for generating sound outputs that can cause constructive interference in a direction toward where the pedestrian is located and destructive interference in other directions based on the acquired location information when the pedestrian is located within a predetermined distance from the vehicle;
    determining pedestrian distribution density of an area based on location information of the plurality of pedestrians acquired by an imaging device, wherein the control signal is configured to control a warning sound to the area such that a warning sound to an area having a higher pedestrian distribution density has a higher intensity than a warning sound to an area having a lower pedestrian distribution density, and control the warning sound to the area such that a warning sound to an area having a higher pedestrian distribution density is output to a wider range than a warning sound to an area having a lower pedestrian distribution density; and
    generating sound outputs based on the control signal using a speaker array of the vehicle such that a warning sound is amplified in the direction toward where the pedestrian is located by the constructive interference and the warning sound is lessened in other directions by the destructive interference.

11. The method of claim 10, wherein acquiring location information of the pedestrian comprises acquiring coordinate information of the pedestrian with respect to the vehicle.

12. The method of claim 10, wherein generating a control signal comprises generating a control signal for outputting the warning sound to an area within a predetermined distance from the pedestrian based on the acquired location information of the pedestrian.

13. The method of claim 10, further comprising calculating a distance between the vehicle and the pedestrian based on the acquired location information of the pedestrian, wherein generating a control signal comprises controlling intensity of the warning sound by the speaker array based on the calculated distance between the vehicle and the pedestrian.

14. The method of claim 10, wherein generating a control signal comprises generating a control signal for removing a warning sound in a direction where the pedestrian is not located.

15. The method of claim 10, further comprising calculating a time-to-collision (TTC) between the vehicle and the pedestrian.

16. The method of claim 15, wherein generating a control signal comprises controlling intensity of the warning sound output by the speaker array based on the calculated time-to-collision.

* * * * *